United States Patent
Goudie

(10) Patent No.: US 7,637,486 B2
(45) Date of Patent: Dec. 29, 2009

(54) VERY HIGH DAMPING BODY MOUNT, SUBFRAME MOUNT OR ENGINE MOUNT WITH BOLT-THROUGH CONSTRUCTION

(75) Inventor: Robert J. Goudie, North Ridgeville, OH (US)

(73) Assignee: The Pullman Company, Milan, OH (US)

( * ) Notice: Subject to any disclaimer, the term of this patent is extended or adjusted under 35 U.S.C. 154(b) by 0 days.

(21) Appl. No.: 11/827,075

(22) Filed: Jul. 10, 2007

(65) Prior Publication Data

US 2008/0018031 A1    Jan. 24, 2008

Related U.S. Application Data

(60) Provisional application No. 60/831,873, filed on Jul. 19, 2006.

(51) Int. Cl.
    *F16F 13/00*    (2006.01)
(52) U.S. Cl. ............... 267/140.13; 267/140.11; 267/141.1; 267/141.5; 267/219; 267/293
(58) Field of Classification Search .......... 267/140.11, 267/140.13, 140.4, 141, 141.1, 141.2, 141.4, 267/141.5, 293, 294, 219; 248/562, 636
See application file for complete search history.

(56) References Cited

U.S. PATENT DOCUMENTS

| | | | | |
|---|---|---|---|---|
| 4,632,370 A | * | 12/1986 | Ticks et al. | 267/219 |
| 4,832,319 A | * | 5/1989 | Noguchi et al. | 267/140.13 |
| 4,936,556 A | * | 6/1990 | Makibayashi et al. | 267/140.13 |
| 5,005,810 A | * | 4/1991 | Sawada et al. | 267/140.13 |
| 5,172,893 A | * | 12/1992 | Bouhier et al. | 267/140.12 |
| 5,205,545 A | * | 4/1993 | Quast | 267/140.13 |
| 5,386,973 A | * | 2/1995 | Brenner et al. | 267/140.13 |
| 2004/0135299 A1 | * | 7/2004 | Kuwayama | 267/140.4 |

* cited by examiner

*Primary Examiner*—Robert A Siconolfi
*Assistant Examiner*—Mariano Sy
(74) *Attorney, Agent, or Firm*—Harness, Dickey & Pierce, PLC

(57) ABSTRACT

A hydraulic mount has an upper support member and a lower support member. An upper elastomeric spring and a lower elastomeric spring are disposed between the upper support member and the lower support member to define an upper fluid chamber and a lower fluid chamber. A channel extends between the upper and lower chambers. During compression and extension of the hydraulic mount, fluid transfers between the upper and lower chamber to provide a damping force for the hydraulic mount.

28 Claims, 3 Drawing Sheets

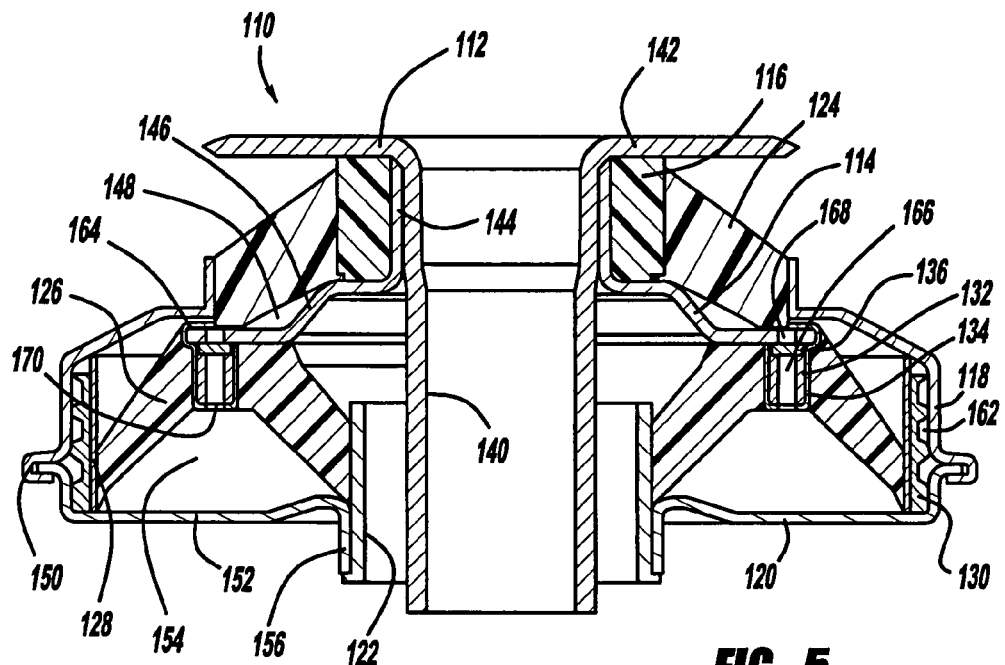

VERY HIGH DAMPING BODY MOUNT, SUBFRAME MOUNT OR ENGINE MOUNT WITH BOLT-THROUGH CONSTRUCTION

CROSS-REFERENCE TO RELATED APPLICATIONS

This application claims the benefit of U.S. Provisional Application No. 60/831,873, filed on Jul. 19, 2006. The disclosure of the above application is incorporated herein by reference.

FIELD

The present disclosure relates to body mounts, subframe mounts, engine mounts or other similar type mounting systems. More particularly, the present disclosure relates to a mounting system with a very high damping level which includes a bolt-through construction.

BACKGROUND

The statements in this section merely provide background information related to the present disclosure and may not constitute prior art.

Fluid filled vibration damping mounts are utilized for automotive engine mounts, subframe mounts and body mounts. These damping mounts couple two components together while damping the vibrations between the components. Typically there is an upper mount and a lower mount precompressed against each other prior to the working load being applied to the mounting system.

SUMMARY

The present disclosure provides the art with a hydraulic mount which includes two chambers and an interconnecting channel extending between the two channels. The damping of the mount is achieved by the resonance of the mass of the fluid in the connecting channel. The tuning for the mount is accomplished by adjusting the length and cross-sectional area of the connecting channel.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 5 is a side cross-sectional view of the mount shown in FIG. 4 taken in a plane 90° to the plane illustrated in FIG. 4; and FIG. 6 is a side cross-sectional view of a mount in accordance with another embodiment of the present disclosure.

DETAILED DESCRIPTION

Figure 1:
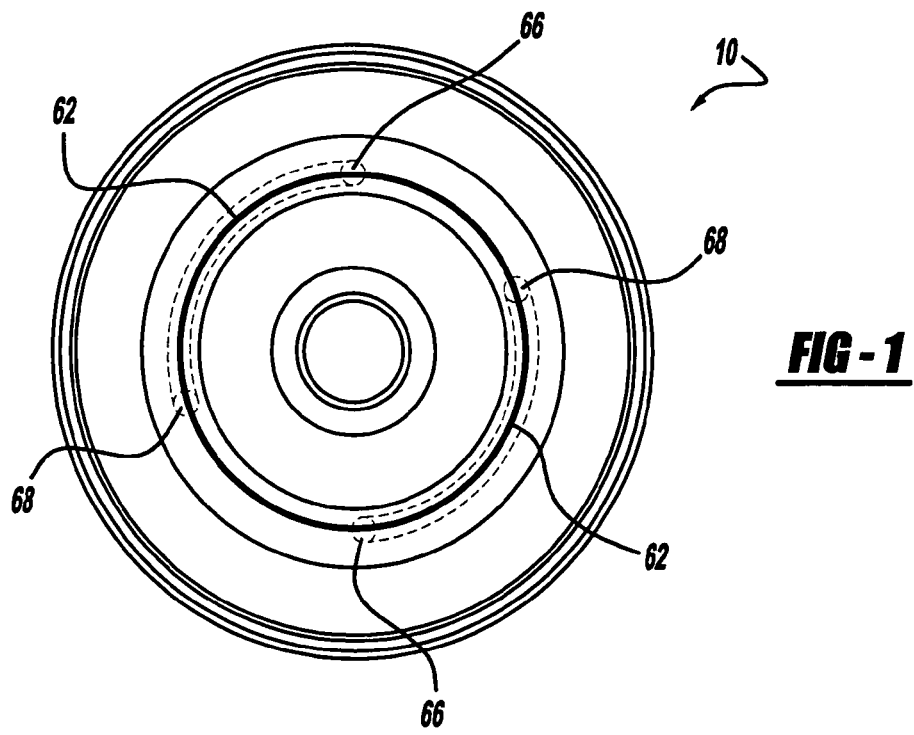
FIG. 1 is a top plan view of the mount in accordance with the present disclosure.
Figure 2:
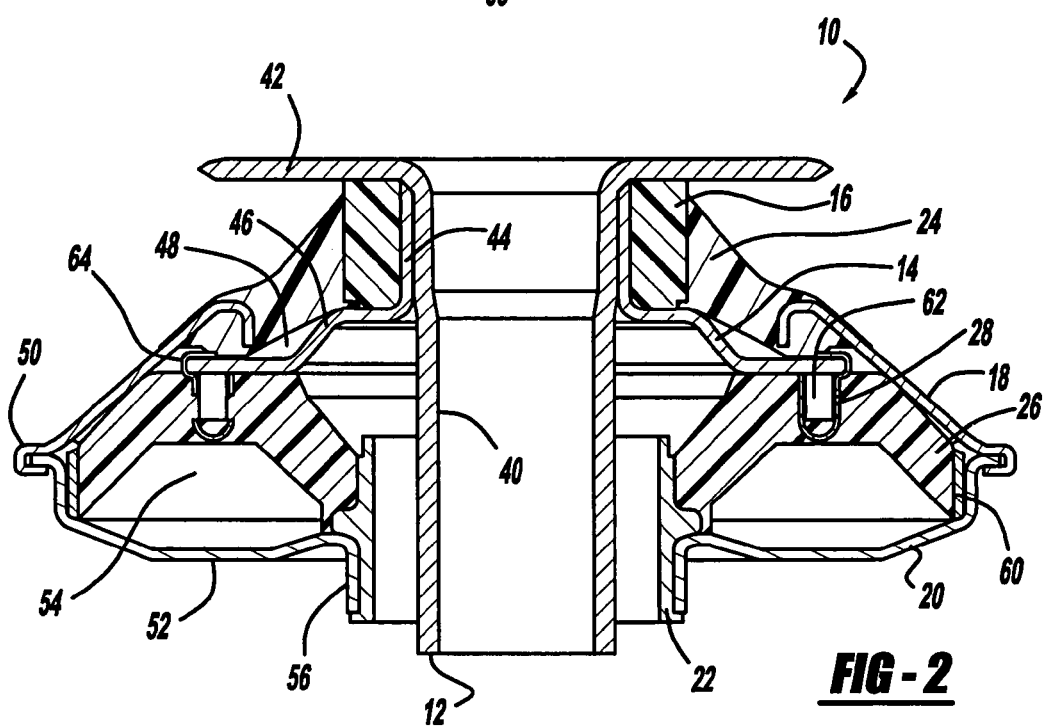
FIG. 2 is a side cross-sectional view of the mount illustrated in FIG. 1 in a free state.
Figure 3:
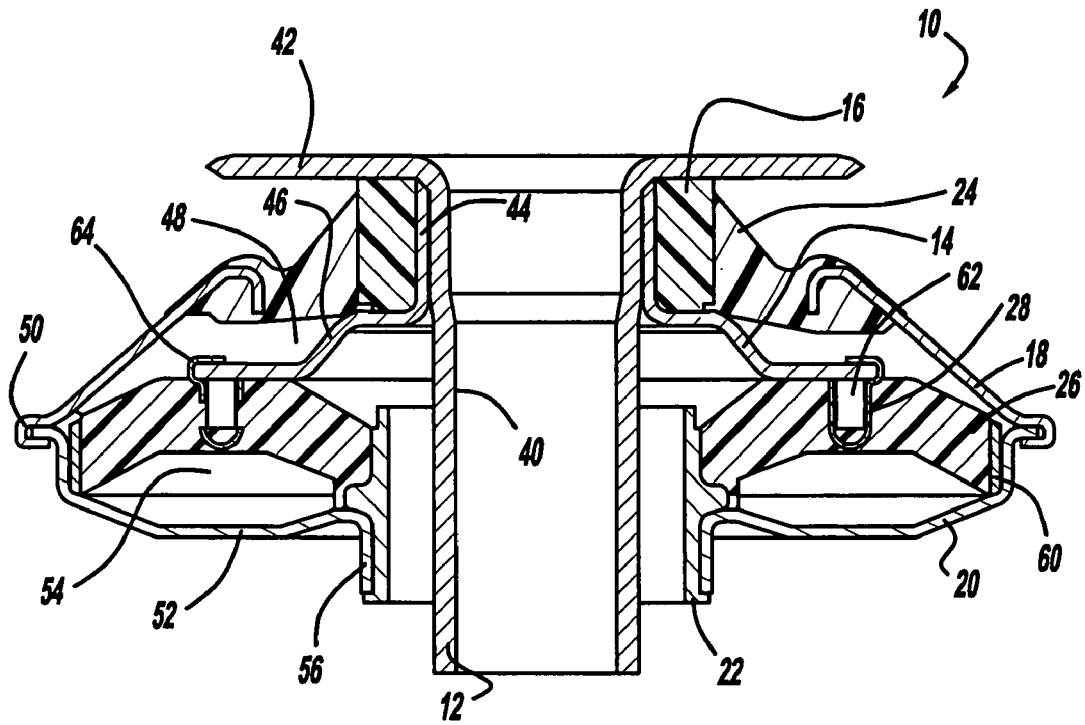
FIG. 3 is a side cross-sectional view of the mount illustrated in FIG. 1 in a compressed state.

The following description is merely exemplary in nature and is not intended to limit the present disclosure, application, or uses. There is illustrated in FIGS. 1-3 a mount in accordance with the present disclosure which is indicated generally by the reference numeral 10. Mount 10 comprises an inner tube 12, an annular connector 14, and inner ring 16, an upper cup 18, a bottom cup 20, an outer tube 22, an upper elastomeric spring 24, a lower elastomeric spring 26 and a channel retainer 28.

Inner tube 12 comprises a cylindrical portion 40 and an annular flange 42. The upper surface of annular flange 42 engages and supports the upper component such as the engine, the vehicle body or the subframe being mounted to the lower component such as the frame or chassis of the vehicle. Cylindrical portion 40 is adapted to receive a mounting bolt for the bolt-through design for mount 10.

Annular connector 14 comprises a cylindrical portion 44 which engages cylindrical portion 40 of inner tube 12 and an annular portion 46 which forms a portion of a sealed upper chamber 48 as discussed below. Inner ring 16 is disposed around cylindrical portion 44 of annular connector 14 and is disposed between annular flange 42 of inner tube 12 and annular portion 46 of annular connector 14. Inner ring 16 helps to transfer the load of the upper component from inner tube 12 to annular connector 14 as discussed below. Inner tube 12, annular connector 14 and inner ring 16 define an upper support member for the upper component.

Upper cup 18 is an annular member which encircles annular connector 14 to also form a portion of upper chamber 48. Upper elastomeric spring 24 is bonded to both inner ring 16 and upper cup 18 to complete the formation of upper chamber 48. Upper cup 18 includes an attachment flange 50 which is formed around bottom cup 20 during the assembly of mount 10. Bottom cup 20 comprises an annular portion 52 which forms a portion of a sealed lower chamber 54 and a cylindrical portion 56 which engages outer tube 22. The lower surface of bottom cup 20 engages and supports the lower component to which the upper component is being attached. The lower end of outer tube 22 is formed over cylindrical portion 56 of bottom cup 20 during the assembly of mount 10. Upper cup 18, bottom cup 20 and outer tube 22 define a lower support member for the lower component.

Lower elastomeric spring 26 is bonded to outer tube 22 and is also bonded to a retention ring 60 which engages bottom cup 20. Lower elastomeric spring 26 completes the formation of sealed lower chamber 54. Lower elastomeric spring 26 defines one or more fluid channels 62 which extend between upper sealed chamber 48 and lower sealed chamber 54. As illustrated in the figures, mount 10 includes two fluid channels 62. Channel retainer 28 is an annular member which is molded into lower elastomeric spring 26 to provide support for fluid channels 62. Channel retainer 28 defines an attachment flange 64 which is formed over annular connector 14 during the assembly of mount 10. An upper port 66 formed through annular portion 46 of annular connector 14 allows communication between a respective fluid channel 62 and upper sealed chamber 48. As illustrated in the figures, mount 10 includes two upper ports 66. A lower port 68 formed through lower elastomeric spring 26 and channel retainer 28 allows communication between a respective fluid channel 62 and lower sealed chamber 54. As illustrated in the figures, mount 10 includes two lower ports 68. Thus, as illustrated in the figures, there are two communication passages between sealed upper chamber 48 and sealed lower chamber 54. Each communication passage is formed by a respective upper port 66, a respective fluid channel 62 and a respective lower port 68.

Sealed upper chamber 48 and sealed lower chamber 54 and fluid channels 62 are filled with a liquid. The damping characteristics for mount 10 are achieved by the resonance of the mass of the fluid in fluid channels 62. The very high damping characteristics of mount 10 are achieved by having sealed upper chamber 48 and sealed lower chamber 54 very large in relation to the package size and also by the positive pumping action of mount 10. In each direction of motion of mount 10 (up and down as illustrated in FIG. 2) one of sealed upper chamber 48 or sealed lower chamber 54 is raised to a higher pressure than the other chamber 48 or 54 leading to very effective pumping of the fluid in fluid channels 62. FIG. 2 illustrates mount 10 in a free state and FIG. 3 illustrates mount 10 in a compressed state. It can be seen that as mount 10 is compressed, the load is supported by inner tube 12, inner ring 16 and annular connector 14. This load increases the pressure in sealed lower chamber 54 and lowers the pressure in sealed upper chamber 48 forcing fluid from sealed lower chamber 54 through fluid channels 62 and into sealed upper chamber 48 due to the flexing of upper elastomeric spring 24 and lower elastomeric spring 26. In a similar manner, when mount 10 is extended, inner tube 12, inner ring 16 and annular connector 14 move upward increasing the pressure in sealed upper chamber 48 and decreasing the fluid pressure in lower sealed chamber 54 forcing fluid from sealed upper chamber 48 through fluid channels 62 and into sealed lower chamber 54 due to the flexing of upper elastomeric spring 24 and lower elastomeric spring 26. In this way, the fluid in fluid channels 62 is made to resonate as the upper surface of inner tube 12 moves up and down in relation to the lower surface of bottom cup 20.

The tuning for mount 10 is accomplished by changing the number, changing the cross-sectional area and changing the length of fluid channels 62. Also, the design for ports 66 and 68 can be used to affect the tuning for mount 10.

Figure 4:
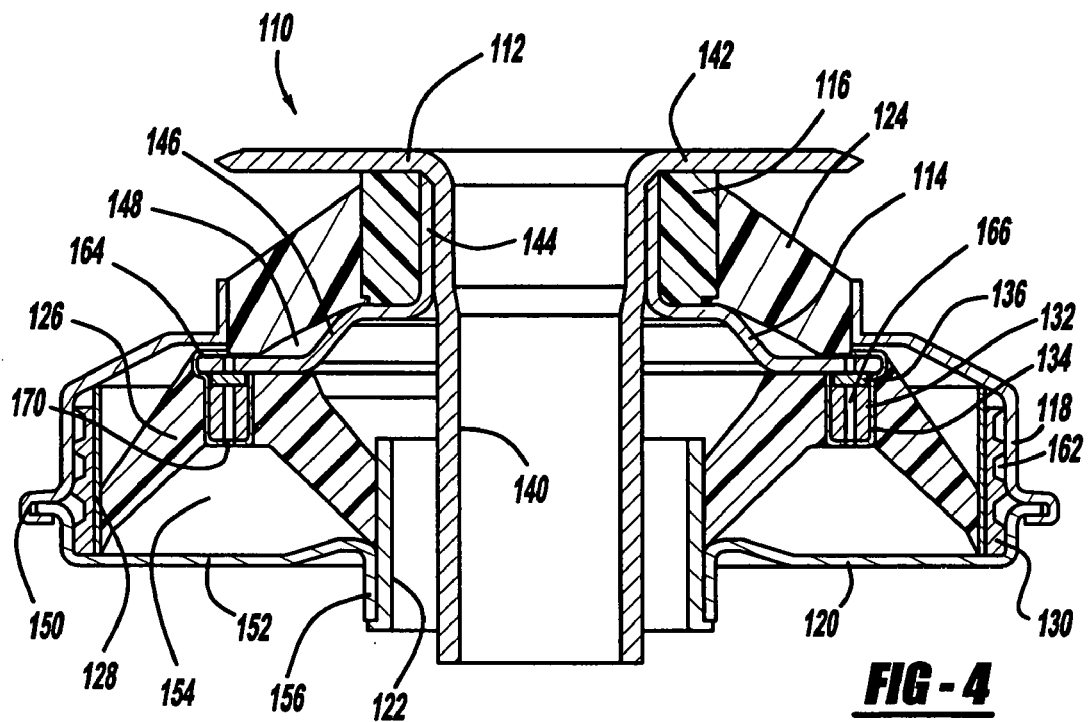
FIG. 4 is a side cross-sectional view of a mount in accordance with another embodiment of the present disclosure.

Referring now to FIG. 4, a mount in accordance with another embodiment of the present disclosure is indicated generally by the reference number 110. Mount 110 comprises an inner tube 112, an annular connector 114, an inner ring 116, an upper cup 118, a bottom cup 120, an outer tube 122, an upper elastomeric spring 124, a lower elastomeric spring 126, an outer ring 128, an annular channel ring 130, a channel retainer 132, an apertured ring 134 and a floating ring 136.

Inner tube 112 comprises a cylindrical portion 140 and an annular flange 142. The upper surface of annular flange 142 engages the upper component such as the engine, the vehicle body or the subframe being mounted to the lower component such as the frame or chassis of the vehicle. Cylindrical portion 140 is adapted to receive a mounting bolt for the bolt-through design for mount 110.

Annular connector 114 comprises a cylindrical portion 144 which engages cylindrical portion 140 of inner tube 112 and an annular portion 146 which forms a portion of a sealed upper chamber 148 as discussed below. Inner ring 116 is disposed around cylindrical portion 144 of annular connector 114 and is disposed between annular flange 142 of inner tube 112 and annular portion 146 of annular connector 114. Inner ring 116 helps to transfer the load of the upper component from inner tube 112 to annular connector 114 as discussed below.

Upper cup 118 is an annular member which encircles annular connector 114 to also form a portion of upper chamber 148. Upper elastomeric spring 124 is bonded to both inner ring 116 and upper cup 118 to complete the formation of upper chamber 148. Upper cup 118 includes an attachment flange 150 which is formed around bottom cup 120 during the assembly of mount 110. Bottom cup 120 comprises an annular portion 152 which forms a portion of a sealed lower chamber 154 and a cylindrical portion 156 which engages outer tube 122. The lower surface of bottom cup 120 engages the lower component to which the upper component is being attached. The lower end of outer tube 122 is formed over cylindrical portion 156 during the assembly of mount 110.

Lower elastomeric spring 126 is bonded to outer tube 122 and is also bonded to outer ring 128. Lower elastomeric spring 126 and outer ring 128 complete the formation of sealed lower chamber 154.

Annular channel ring 130 is disposed around outer ring 128 and annular channel ring 130 defines one or more fluid channels 162 which are disposed between sealed upper chamber 148 and sealed lower chamber 154. One end of each fluid channel 162 is open to sealed upper chamber 148 and the opposite end of each fluid channel 162 is open to sealed lower chamber 154 to allow fluid flow between sealed fluid chambers 148 and 154 as described below. Sealed upper chamber 148, sealed lower chamber 154 and fluid channels 162 are filled with a liquid.

Channel retainer 132 is an annular member which is molded into lower elastomeric spring 126. Channel retainer 132 defines an attachment flange 164 which is formed over annular connector 114 during the assembly of mount 110. Apertured ring 134 is inserted into channel retainer 132. Apertured ring 134 defines a plurality of apertures 166 extending through apertured ring 134. Apertures 166 are circumferentially spaced around apertured ring 134 and each aperture 166 can be a different diameter in order to tune mount 110. As illustrated in FIG. 4, two diametrically opposed apertures 166 have the same relatively small diameter and are sized to provide a relatively stiff damping. The two diametrically opposed apertures 166 located ninety degrees from apertures 166 illustrated in FIG. 5 has a relatively large diameter which would then provide a relatively soft damping in that radial direction as described below.

Floating ring 136 is located adjacent apertured ring 134 and it is allowed to move axially with respect to apertured ring 134 to allow flow through apertures 166 for small amplitudes of motion for mount 110. Annular portion 146 of annular connector 114 defines one or more fluid apertures 168 and channel retainer 132 defines one or more fluid apertures 170 which in conjunction with apertures 166 will allow fluid flow between sealed fluid chambers 148 and 154. The fluid flow between sealed fluid chambers 148 and 154 through apertures 166, 168 and 170 is controlled by floating ring 136. For small compression and extension movements of mount 110, fluid will flow relatively unrestricted between sealed fluid chambers 148 and 154. The amount of movement for relatively unrestricted fluid flow through apertures 166, 168 and 170 will be determined by the axial movement of floating ring 136. Floating ring 136 moves axially upward to seal against annular portion 146 of annular connector 114 to close apertures 168 and floating ring 136 moves axially downward to seal against apertured ring 134 to seal apertures 166. The amount of axial movement of floating ring 136 between apertured ring 134 and annular portion 146 of annular connector 114 determines the amount of relatively unrestricted fluid flow. In this way, the high frequency vibration characteristics of mount 110 are tuned to have a lower stiffness and better isolation of noise and vibration. The high frequency characteristics for mount 110 can be tuned by selecting the number and diameter of apertures 166 and 168. As illustrated in FIG. 4, relatively small apertures 166 are selected to provide a relatively stiff characteristic in the chosen plane. As illustrated in FIG. 5, relatively large apertures 166 are selected to provide a relatively soft characteristic in the chosen plane.

The low frequency damping characteristics for mount 110 are achieved by the resonance of the mass of fluid in fluid channels 162. The very high damping characteristics for mount 110 are achieved by having sealed upper chamber 148 and sealed lower chamber 154 very large in relation to the package size and also by the positive pumping action of mount 110. In each direction of motion of mount 110 (up and down as illustrated in FIG. 4) one of sealed upper chamber 148 or sealed lower chamber 154 is raised to a higher pressure than the other chamber 148 or 154 leading to very effective pumping of the fluid in fluid channels 162. It can be seen that as mount 110 is compressed, the load is supported by inner tube 112, inner ring 116 and annular connector 114. This load increases the pressure in sealed lower chamber 154 and lowers the pressure in sealed upper chamber 148 forcing fluid from sealed lower chamber 154 through fluid channels 162 and into sealed upper chamber 148. In a similar manner, when mount 110 is extended, inner tube 112, inner ring 116 and annular connector 114 move upward increasing the pressure in sealed upper chamber 148 and decreasing the fluid pressure in lower sealed chamber 154 forcing fluid from sealed upper chamber 148 through fluid channels 162 and into sealed lower chamber 154. In this way, the fluid in fluid channels 162 is made to resonate as the upper surface of inner tube 112 moves up and down in relation to the lower surface of bottom cup 120.

The tuning for mount 110 is accomplished by changing the number, changing the cross-sectional area and changing the length of fluid channels 162. Also, the design for the openings to sealed chambers 148 and 154 can be used to affect the tuning for mount 110.

Referring now to FIG. 6, a mount in accordance with another embodiment of the present disclosure is indicated generally by the reference numeral 210. Mount 210 comprises an inner tube 212, an annular connector 214, an inner ring 216, an upper cup 218, a bottom cup 220, an outer tube 222, an upper elastomeric spring 224, a lower elastomeric spring 226, a channel retainer 228 and a channel ring 230.

Inner tube 212 comprises a cylindrical portion 240 and an annular flange 242. The upper surface of annular flange 242 engages and supports the upper component such as the engine, the vehicle body or the subframe being mounted to the lower component such as the frame or chassis of the vehicle. Cylindrical portion 240 is adapted to receive a mounting bolt for the bolt-through design for mount 210.

Annular connector 214 comprises a cylindrical portion 244 which engages cylindrical portion 240 of inner tube 212 and an annular portion 246 which forms a portion of a sealed upper chamber 248 as discussed below. Inner ring 216 is disposed around cylindrical portion 244 of annular connector 214 and is disposed between annular flange 242 of inner tube 212 and annular portion 246 of annular connector 214. Inner ring 216 helps to transfer the load of the upper component from inner tube 212 to annular connector 214 as discussed below. Inner tube 212, annular connector 214 and inner ring 216 define an upper support member for the upper component.

Upper cup 218 is an annular member which encircles annular connector 214 to also form a portion of upper chamber 248. Upper elastomeric spring 224 is bonded to both inner ring 216 and upper cup 218 to complete the formation of upper chamber 248. Upper cup 218 includes an attachment flange 250 which is formed around bottom cup 220 during the assembly of mount 210. Bottom cup 220 comprises an annular portion 252 which forms a portion of a sealed lower chamber 254 and a cylindrical portion 256 which engages outer tube 222. The lower surface of bottom cup 220 engages and supports the lower component to which the upper component is being attached. The lower end of outer tube 222 is formed over cylindrical portion 256 of bottom cup 220 during the assembly of mount 210. Upper cup 218, bottom cup 220 and outer tube 222 define a lower support member for the lower component.

Lower elastomeric spring 226 is bonded to outer tube 222 and is also bonded to a retention ring 260 which engages bottom cup 220. Lower elastomeric spring 226 completes the formation of sealed lower chamber 254. Lower elastomeric spring 226 defines the one or more fluid channels 62 which extend between upper sealed chamber 248 and lower sealed chamber 254. Similar to mount 10, mount 310 includes two fluid channels 62. Channel retainer 228 is an annular member which is molded into lower elastomeric spring 226 to provide support for fluid channels 62. Channel retainer 228 defines an attachment flange 264 which is formed over annular connector 214 during the assembly of mount 210. Upper port 66 formed through annular portion 246 of annular connector 214 allows communication between a respective fluid channel 62 and upper sealed chamber 248. Similar to mount 10, mount 210 includes the two upper ports 66. Lower port 68 formed through lower elastomeric spring 226 and channel retainer 228 allows communication between a respective fluid channel 62 and lower sealed chamber 254. Similar to mount 10, mount 210 includes two lower ports 68. Thus, as illustrated in the figures, there are two communication passages between sealed upper chamber 248 and sealed lower chamber 254. Each communication passage is formed by a respective upper port 66, a respective fluid channel 62 and a respective lower port 68.

Sealed upper chamber 248 and sealed lower chamber 254 and fluid channels 62 are filled with a fluid, preferably a liquid. The damping characteristics for mount 10 are achieved by the resonance of the mass of the fluid in fluid channels 62. The very high damping characteristics of mount 210 are achieved by having sealed upper chamber 248 and sealed lower chamber 254 very large in relation to the package size and also by the positive pumping action of mount 210. In each direction of motion of mount 210 (up and down as illustrated in FIG. 6) one of sealed upper chamber 248 or sealed lower chamber 254 is raised to a higher pressure than the other chamber 248 or 254 leading to very effective pumping of the fluid in fluid channels 62. The fluid flow for mount 210 is the same as described above for mount 10.

Referring now to FIG. 6, channel ring 230 is disposed within sealed upper chamber 248 and is attached to upper cup 218 by having the end of upper cup 218 formed over channel ring 230 during the assembly of mount 210. Channel ring 230 provides for the radial damping by mount 210 which is in addition to the axial damping described above.

Upper elastomeric spring 224 defines a first chamber 270 and a second chamber 272 circumferentially spaced from first chamber 270. FIG. 6 illustrates a one-hundred eighty degree circumferential spacing for first and second chambers 270 and 272 for purposes of illustration. It is within the scope of the present disclosure to have a different spacing for chambers 270 and 272 and also to have more than two interconnecting chambers if the tuning of mount 210 requires it.

As illustrated, upper cup 218 defines a first port 274 opening into first chamber 270 and a second port 276 opening into second chamber 272. Channel ring 230 defines a fluid channel 278 which extends between first port 274 and second port 276. Thus, first chamber 270 is in communication with second chamber 272 through first port 274, fluid channel 278 and second port 276.

During axial compression or extension of mount 210, both chambers 270 and 272 will be compressed or extended since the upper elastomeric spring 224 is attached to inner ring 216 which moves with inner tube 212 and upper elastomeric spring 224 is also attached to upper cup 218 which moves with bottom cup 220. In this mode, there will be no movement of the fluid within chambers 270 and 272 or the fluid within fluid channel 278 and therefore there will be no fluid flow or damping.

When inner tube 212 moves in a radial direction with respect to bottom cup 220, fluid will be forced from chamber 270 to chamber 272 or from chamber 272 to chamber 270 depending on the radial direction. This flow of fluid through fluid channel 278 is made to resonate as mount 210 vibrates from side to side and thus produces a damping load.

The tuning for mount 210 in the radial direction is accomplished by changing the number, changing the cross-sectional area and changing the length of fluid channels 278. Also, the design for ports 274 and 276 can be used to affect the tuning for mount 210.

What is claimed is:

1. A mount comprising:
   an upper support member;
   a lower support member movable with respect to the upper support member to define axial movement of the mount;
   an upper elastomeric spring bonded to the upper support member and bonded to the lower support member, the upper elastomeric spring flexing during all axial movement of the mount;
   a lower elastomeric spring attached directly to the upper support member and bonded to the lower support member, the lower elastomeric spring flexing during all axial movement of the mount;
   an upper chamber defined by the upper elastomeric spring;
   a lower chamber defined by the lower elastomeric spring; and
   a channel extending between the upper chamber and the lower chamber.

2. The mount according to claim 1 wherein the upper support member comprises an inner tube and an annular connector attached to the inner tube.

3. The mount according to claim 1 wherein the lower support member comprises an upper cup and a lower cup attached to the upper cup.

4. The mount according to claim 3 wherein the upper elastomeric spring is bonded to the upper cup.

5. The mount according to claim 3 wherein the lower support member further comprises an outer tube attached to the lower cup.

6. The mount according to claim 5 wherein the lower elastomeric spring is bonded to the outer tube.

7. The mount according to claim 6 wherein the upper elastomeric spring is bonded to the upper cup.

8. The mount according to claim 1 wherein the lower elastomeric spring defines the channel.

9. The mount according to claim 8 further comprising a channel retainer disposed within the lower elastomeric spring, the channel being disposed within the channel retainer.

10. The mount according to claim 1 further comprising an apertured ring disposed within the lower elastomeric spring, the apertured ring defining a plurality of apertures extending between the lower chamber and the upper chamber.

11. The mount according to claim 10 further comprising a floating ring disposed adjacent the apertured ring, the floating ring controlling fluid flow through the plurality of apertures.

12. The mount according to claim 10 wherein at least two of said plurality of apertures have a different size.

13. The mount according to claim 10 further comprising a channel retainer disposed within the lower elastomeric spring, the apertured ring being disposed within the channel retainer.

14. The mount according to claim 10 further comprising an annular channel ring disposed around the lower elastomeric spring, the annular channel ring defining the channel.

15. The mount according to claim 1 further comprising an annular channel ring disposed around the lower elastomeric spring, the annular channel ring defining the channel.

16. The mount according to claim 1 wherein:
   the upper support member comprises an inner tube and an annular connector attached to the inner tube; and
   the lower support member comprises an upper cup and a lower cup attached to the upper cup.

17. The mount according to claim 16 wherein the inner tube extends through the annular connector, the upper cup and the lower cup.

18. The mount according to claim 16 wherein the upper support member further comprises an inner ring disposed between the inner tube and the annular connector.

19. The mount according to claim 18 wherein the inner tube extends through the annular connector, the upper cup, the lower cup and the inner ring.

20. The mount according to claim 18 wherein the lower support member further comprises an outer tube attached to the lower cup.

21. The mount according to claim 20 wherein the inner tube extends through the annular connector, the upper cup, the lower cup, the inner ring and the outer tube.

22. The mount according to claim 16 wherein the lower support member further comprises an outer tube attached to the lower cup.

23. The mount according to claim 22 wherein the inner tube extends through the annular connector, the upper cup, the lower cup and the outer tube.

24. The mount according to claim 1 further comprising:
   a first side chamber defined by one of the upper and lower elastomeric springs;
   a second side chamber defined by one of the upper and lower elastomeric springs;
   a side channel extending between said first and second side chambers.

25. The mount according to claim 24 wherein the first and second side chambers are defined by the upper elastomeric spring.

26. The mount according to claim 25 further comprising a channel ring, the side channel being formed by the channel ring.

27. A mount comprising:
   an upper support member;
   a lower support member movable with respect to the upper support member to define axial movement of the mount;
   an upper elastomeric spring bonded to the upper support member and bonded to the lower support member, the upper elastomeric spring flexing during all axial movement of the mount;
   a lower elastomeric spring attached to the upper support member and bonded to the lower support member, the lower elastomeric spring flexing during all axial movement of the mount;
   an upper chamber defined by the upper elastomeric spring;
   a lower chamber defined by the lower elastomeric spring; and
   a channel extending between the upper chamber and the lower chamber; wherein
   the upper support member comprises an inner tube and an annular connector attached to the inner tube; and
   the upper support member further comprises an inner ring disposed between the inner tube and the annular connector.

28. The mount according to claim 27 wherein the upper elastomeric spring is bonded to the inner ring.

* * * * *